(12) United States Patent
Komiya et al.

(10) Patent No.: US 9,547,890 B2
(45) Date of Patent: Jan. 17, 2017

(54) IMAGE PROCESSING APPARATUS AND IMAGE PROCESSING METHOD

(71) Applicant: Hitachi Kokusai Electric Inc., Tokyo (JP)

(72) Inventors: Yuichiro Komiya, Tokyo (JP); Muneaki Yamaguchi, Tokyo (JP); Haruhiro Koto, Tokyo (JP)

(73) Assignee: HITACHI KOKUSAI ELECTRIC INC. (JP)

( * ) Notice: Subject to any disclaimer, the term of this patent is extended or adjusted under 35 U.S.C. 154(b) by 0 days.

(21) Appl. No.: 14/902,626

(22) PCT Filed: Jul. 2, 2014

(86) PCT No.: PCT/JP2014/067688
§ 371 (c)(1),
(2) Date: Jan. 4, 2016

(87) PCT Pub. No.: WO2015/005196
PCT Pub. Date: Jan. 15, 2015

(65) Prior Publication Data
US 2016/0171664 A1    Jun. 16, 2016

(30) Foreign Application Priority Data
Jul. 9, 2013  (JP) ................................. 2013-143702

(51) Int. Cl.
*G06K 9/40* (2006.01)
*G06T 5/00* (2006.01)
(Continued)

(52) U.S. Cl.
CPC ............. *G06T 5/002* (2013.01); *G06K 9/4642* (2013.01); *G06K 9/4652* (2013.01);
(Continued)

(58) Field of Classification Search
CPC ......... G06T 5/002; G06T 5/003; G06T 5/009; G06T 5/40; G06T 5/50; G06T 7/0071; G06T 7/0079; G06T 7/20; G06T 7/2006; G06T 7/2013; G06T 7/2073; G06T 7/2086; G06T 9/001; G06T 9/004; G06T 2207/20172; G06T 2207/20182; G06T 2207/20192; G06T 2207/20201; G06T 2207/30232; G06T 2207/30196–2207/30201; G06K 9/4642; G06K 9/4652; G06K 9/6212; G06K 9/40; G06K 9/46; G06K 9/4647; G06K 9/00711; G06K 9/00744; G06K 9/00758; G06K 9/00765; G06K 9/00771; G06K 9/00778; G06K 9/6202; G06K 9/00791; G06K 2009/4666; H04N 1/58; H04N 1/409; H04N 1/4092; H04N 5/23248; H04N 5/23254; H04N 5/23264; H04N 5/23251; H04N 5/357; H04N 5/144; H04N 5/23267; H04N 5/272; H04N 5/2171; H04N 7/0137; H04N 7/0157; H04N 7/18; H04N 7/188; H04N 7/0115; H04N 13/0033; H04N 13/0264; H04N 19/137; H04N 19/159; H04N 19/172; H04N 19/51; H04N 19/527; H04N 19/53; H04N 19/533; H04N 19/543; H04N 19/553; H04N 19/573; H04N 19/577; H04N 19/58; H04N 19/583; H04N 21/8455
See application file for complete search history.

(56) References Cited

U.S. PATENT DOCUMENTS 7,834,919 B2 * 11/2010 Yachi .................. H04N 5/23248
                                                        348/208.6
8,494,217 B2 *  7/2013 Ishiwatari ............. G06T 3/4053
                                                        382/103
(Continued)

FOREIGN PATENT DOCUMENTS

JP    2006-302115 A    11/2006
JP    2008-160733 A     7/2008
(Continued)

OTHER PUBLICATIONS

International Search Report.

*Primary Examiner* — Jose Couso
(74) *Attorney, Agent, or Firm* — Bacon & Thomas, PLLC

(57) ABSTRACT

An image processing apparatus for reducing fluctuations due to a heat haze in an image including a stationary region and
(Continued)

a moving object obtains histogram of gradation distribution for each of a target image to be corrected and a frame for correction, and corrects the target image by using the frame for correction while changing a mixing ratio between the target image and the frame for correction depending on similarity between histograms. To adaptively control a size of image blocks for the histograms, the apparatus calculates two indices having different robustness to deformation of an object from image blocks of each of the target image and the frame for correction, and determines suitability of the image block size based on a relationship of the indices. The difference between the histograms and the sum of absolute differences (SAD) between the pixel values can be used as the two indices.

7 Claims, 16 Drawing Sheets

(51) Int. Cl.
G06T 5/40 (2006.01)
H04N 5/232 (2006.01)
G06K 9/46 (2006.01)
G06K 9/62 (2006.01)
G06T 5/50 (2006.01)
H04N 7/18 (2006.01)

(52) U.S. Cl.
CPC ............ *G06K 9/6212* (2013.01); *G06T 5/003* (2013.01); *G06T 5/40* (2013.01); *G06T 5/50* (2013.01); *H04N 5/23254* (2013.01); *H04N 5/23264* (2013.01); *G06T 2207/10016* (2013.01); *G06T 2207/20182* (2013.01); *G06T 2207/30232* (2013.01); *H04N 7/18* (2013.01)

(56) References Cited

U.S. PATENT DOCUMENTS

| | | | |
|---|---|---|---|
| 9,292,934 B2* | 3/2016 | Komiya | G06T 7/20 |
| 2008/0151067 A1 | 6/2008 | Yachi | |
| 2013/0301881 A1* | 11/2013 | Ishiwatari | G06T 3/4053 |
| | | | 382/103 |
| 2015/0161773 A1* | 6/2015 | Takahashi | H04N 5/2171 |
| | | | 382/173 |

FOREIGN PATENT DOCUMENTS

| | | |
|---|---|---|
| JP | 2011-215695 A | 10/2011 |
| JP | 2011-229030 A | 11/2011 |
| JP | 2012-182625 A | 9/2012 |
| JP | 2013-122639 A | 6/2013 |
| WO | 2013-084782 A1 | 6/2013 |

* cited by examiner

FIG.13A

| 0 | −k | 0 |
|---|---|---|
| −k | 1+4k | −k |
| 0 | −k | 0 |

FIG.13B

| −k | −k | −k |
|---|---|---|
| −k | 1+8k | −k |
| −k | −k | −k |

IMAGE PROCESSING APPARATUS AND IMAGE PROCESSING METHOD

FIELD OF THE INVENTION

The present invention relates to an image processing apparatus and an image processing method, and more particularly, to an image processing apparatus and an image processing method for reducing degradation of image quality due to a heat haze.

BACKGROUND OF THE INVENTION

Recently, demand for a surveillance camera is increasing with the purpose of crime prevention, field supervision and the like. Further, the function of the surveillance camera is diversifying with the development of semiconductor technology and network technology.

The surveillance camera is easily affected by the change of atmosphere and lighting, and thus improving visibility of an image from the influence is one of the important tasks in the surveillance camera. Among such tasks, an image correction technique represented by stabilizer correction, gradation correction, external disturbance (fog, rain, snowstorm, yellow dust, smog and the like) correction and the like is important and has been applied to various products until now.

A heat haze is one of the natural phenomena that degrade the image visibility of the surveillance camera. When atmospheres having different densities are locally mixed with each other due to the temperature difference of an air and the like, light is refracted to generate a heat haze. If the heat haze is generated, a deformed object is observed. Therefore, in reproduction of a taken image, particular regions in the image appear to fluctuate greatly. As such, the distortion caused by an air fluctuation phenomenon due to a heat haze and the like occurs in the image. For this reason, the visibility of an object is degraded.

In Patent Document 1, it is determined whether or not distortion in an image caused by air fluctuations (in this specification, hereinafter, simply referred to as "distortion") occurs. If it is determined that the distortion occurs, a plurality of images is generated by a continuous shooting and the images are added (averaged) to create one image in which the distortion has been corrected.

In Patent Document 2, an image correction of a heat haze and the like is performed based on an image before one frame.

[Patent Document 1] Japanese Patent Application Publication No. 2012-182625

[Patent Document 2] Japanese Patent Application Publication No. 2011-229030

As in the Patent Documents 1 and 2 above-described, if a plurality of past images taken by continuous shooting are added (averaged), in a case where a moving object (a moving subject) is included in the images, the moving object is projected doubly or trebly. Therefore, there is a possibility that the images are greatly degraded.

SUMMARY OF THE INVENTION

In view of the above, the present invention provides an image processing technology which can reduce distortion generated in an image including both a stationary region and a moving object.

An image processing apparatus in accordance with the present invention obtains gradation distribution (histogram) for each of a target frame to be corrected (a target image to be corrected) and a frame for correction (an image for correction), changes a using ratio between the target frame and the frame for correction depending on similarity between the gradation distributions, and corrects the target frame by using the frame for correction.

The histograms for the target image and the image for correction are obtained by the following process: a plurality of indices having different robustness to deformation of an object is calculated from comparison-target pixel blocks of the target image and the image for correction; based on the relationship of two indices having different robustness, the relationship between an object state in the comparison-target pixel blocks and a comparison-target pixel block size is determined; a suitable comparison-target pixel block size is determined; and the histograms are obtained by the determined comparison-target pixel block size.

Effect of the Invention

In accordance with the image processing apparatus of the present embodiment, in an image including both a stationary region and a moving object, it is possible to provide a high-quality image in which distortion in the image caused by air fluctuations has been reduced. Particularly, it is possible to provide a high-quality image in which distortion with respect to air fluctuations due to the generation of a heat haze has been reduced.

BRIEF DESCRIPTION OF THE DRAWINGS

FIGS. 13A and 13B show a kernel of a sharpening filter used by a high-resolution unit 15.

DETAILED DESCRIPTION OF THE EMBODIMENTS

Figure 1:
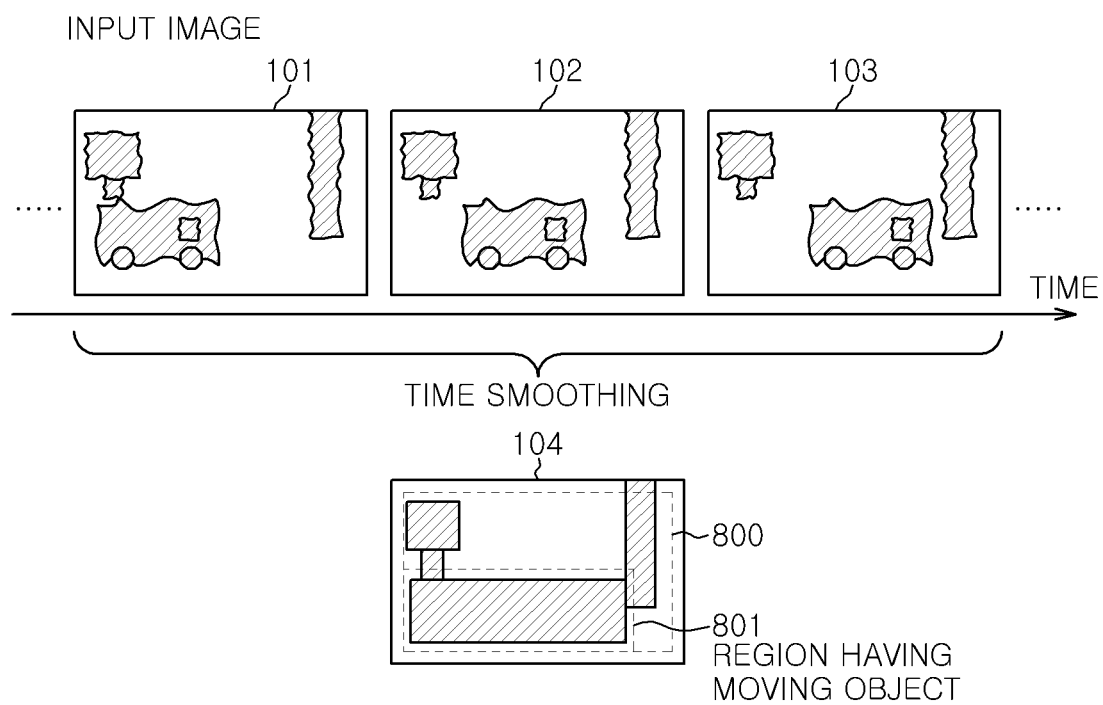
FIG. 1 is a view for explaining the effect of a time smoothing process on an image.

Hereinafter, embodiments of the present invention will be described with reference to the accompanying drawings. In the drawings, like parts are represented by like reference numerals.

The present invention is not limited to the embodiments to be described below, and may include various modified examples. The following embodiments are described in detail merely to clearly explain the present invention and thus the present invention is not necessarily limited to a device including all components to be described below. Further, a part of the configuration of any one of the following embodiments may be substituted with that of another embodiment. Furthermore, the configuration of any one of the following embodiments may be added to the configuration of another embodiment. With respect to a part of the configuration of each embodiment, another configuration may be added, removed and substituted.

The present applicant previously filed Japanese Patent Application Nos. 2012-107470 (referred to as "prior application 1") and 2013-057774 (referred to as "prior application 2") relating to a fluctuation correction technique capable of avoiding a problem of image quality degradation of a moving object. The technique disclosed in the above applications is characterized in that, in a plurality of images taken in time series, regions in which an object moving in the images exists are detected, and depending on its likelihood, effect of time smoothing is adjusted. A background region in which a moving object does not exist is corrected by time smoothing and a region in which a moving object exists is corrected by a spatial process while weakening the effect of time smoothing.

Under the influence of fluctuations, in order to detect a moving object, it is required to detect separately the displacement of a pixel by fluctuations and the displacement of a pixel by movement of an object. In the prior applications 1 and 2, histogram is used to detect the movement of a moving object. Since the histogram for a pixel block focusing a pixel of interest has a property strong on an object deformation, when comparing histograms for temporally different two images, a moving object can be detected even under the influence of fluctuations.

In an image under the influence of fluctuations (an image having distortion), in order to detect a moving object, it is required to detect separately the displacement of a pixel by distortion and the displacement of a pixel by movement of an object. In the prior applications, it becomes possible to detect a moving object even in an image under the influence of fluctuations by comparing the histograms for temporally different two images. As a result, the technique of the prior applications provides a high quality image by removing the influence of air fluctuations generated by a heat haze and the like from an input image even when an image of a moving object is taken.

Specifically, an image processing apparatus (fluctuation correcting device 1) (which will be explained in an embodiment 3 to be described below) disclosed in the prior application 2 makes a time-smoothed image M by using a plurality of images taken in time-series (e.g., past, present (image N) and future images and the like), makes histograms H1 and H2 with respect to each pixel of the image N and the time-smoothed image M, and determines a correction amount of each pixel depending on similarity R between the histograms H1 and H2. By doing so, it is possible to separate the movement of a moving object and the distortion in an image caused by air fluctuations in a stationary region due to a heat haze and the like. Consequently, according to the prior application 2, distortion in the image is reduced and an image having an improved resolution can be created.

That is to say, in an image processing apparatus and an image processing method based on the prior application 2, the detection of a moving object is performed based on histograms for a pixel block basically having a fixed size between images. An appropriate size of a comparison-target pixel block is determined by a level of fluctuations in a target image to be processed. However, if the size of the comparison-target pixel block is smaller than the level of air fluctuations, there arises a concern that a property of the histogram that is robust to a shape change of an object may disappear.

FIG. 1 is a view for explaining the effect of time smoothing of a pixel value on an image. In an upper part of FIG. 1, a plurality of input images 101 to 103 taken at a predetermined time interval is displayed in a time sequence from the left to the right. The input images 101 to 103 are sequentially inputted to an image processing apparatus and are treated as target images to be corrected.

A smoothed image 104 is an averaged image of the input images (input images 101 to 103 in this example) in a time region. In the smoothed image 104, distortion caused by the influence of air fluctuations is corrected by time smoothing in a region 800 of the target images in which an object stands still. This is a basic principle of removing air fluctuations. However, when the smoothing is performed in time domain in a region 801 in which an object is moving, not only the pixel displacement by distortion but also the pixel displacement by movement of the object are smoothed, and thus a smear is formed around the moving object. That is, the time smoothing of a pixel value becomes a cause of image degradation in a case where a moving object exists in the image. As such, it is important to accurately estimate whether a real object is still or moving.

As described above, if the size of a pixel block to be compared (comparison-target pixel block size) is smaller than a distortion level in an image, the property of histogram that is robust to a shape change of an object disappears. Accordingly, the comparison-target pixel block size needs to be larger than the distortion level in an image. However, if the comparison-target pixel block size is too larger than the distortion level, it is difficult to separately detect the distortion and the object movement based on histograms.

Here, the effect of the comparison-target pixel block size on the detection of a moving object will be described in detail with reference to FIGS. 2 and 3.

Figure 2:
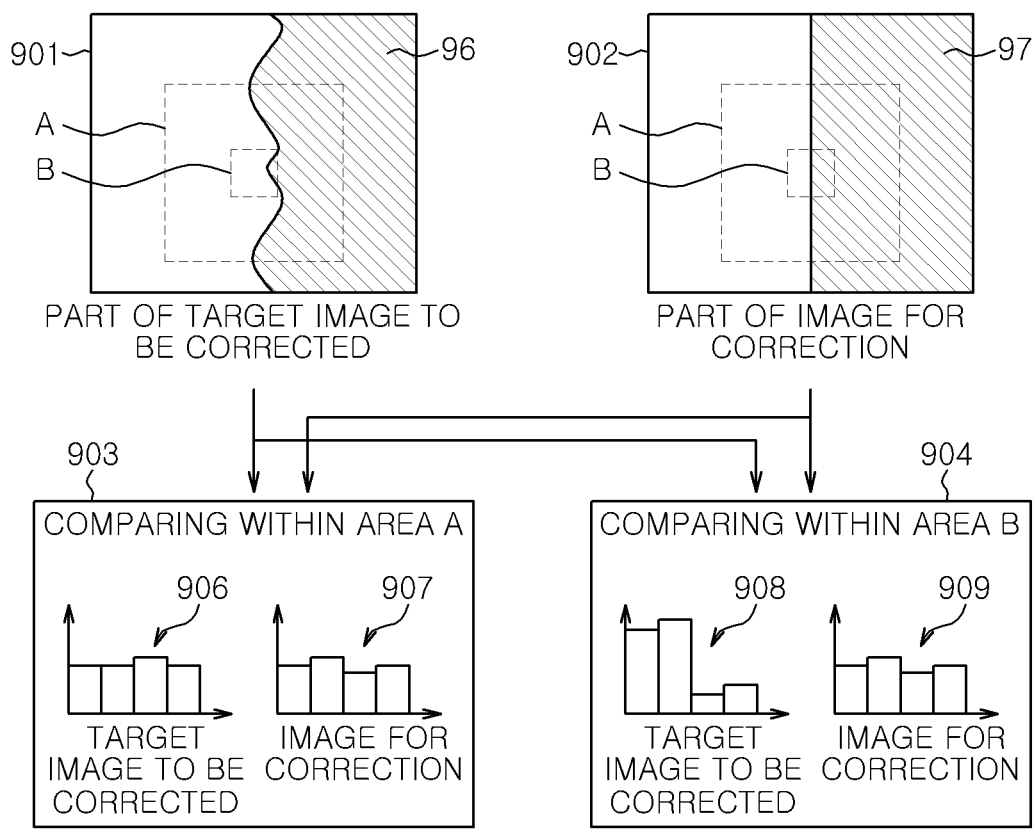
FIG. 2 is a view showing a relationship between image distortion and histogram.

FIG. 2 is a view showing a relationship between image distortion and histogram. An input image 901 shown in an upper part of FIG. 2 is an enlarged view of a part of an entire input image (target image to be corrected). A smoothed image 902 shown in the upper part of FIG. 2 is an image (which is provided for correction) obtained by smoothing a region of the input image 901. An outline of the smoothed image 902 becomes faded in reality.

Two areas "A" and "B" in the input image 901 are comparison-target pixel blocks and sizes of their broken line frames respectively represent the sizes of the comparison-target pixel blocks. The central positions of the areas "A" and "B" are set to be equal. Similarly, in the smoothed image 902 in the upper part of FIG. 2, there are shown two areas "A" and "B" at the same pixel positions (the same angles of view). As can be seen from FIG. 2, the areas "A" and "B" have different block sizes and the block size of the area "A" is larger than the block size of the area "B".

In a part of a pixel region in the input image 901 of FIG. 2, there is shown an object image 96 influenced by air fluctuations (i.e., having distortion at an edge of the image). In the smoothed image 902, the object image 96 becomes an object image 97 that has a reduced distortion by being smoothed.

In a comparison histogram 903 in a lower part of FIG. 2, the areas "A" are set as the comparison-target pixel blocks, and in a comparison histogram 904, the areas "B" are set as the comparison-target pixel blocks. In histograms 906 to 909, the horizontal axis indicates a pixel value (luminance) and the vertical axis indicates a pixel number that belongs to each bin. The histogram 906 is a histogram for a part of the target image to be corrected in a case where an image correcting unit 14 sets the block size of the area "A" in the input image 901 to the comparison-target pixel block size. The histogram 908 is a histogram for a part of the target image to be corrected in a case where the image correcting unit 14 sets the block size of the area "B" in the input image 901 to the comparison-target pixel block size. The histogram 907 is a histogram for a part of the image for correction in a case where the image correcting unit 14 sets the block size of the area "A" in the smoothed image 902 to the comparison-target pixel block size. The histogram 909 is a histogram for a part of the image for correction in a case where the image correcting unit 14 sets the block size of the area "B" in the smoothed image 902 to the comparison-target pixel block size.

As can be seen from the comparison histogram 903, when the comparison-target pixel block size is large (the areas "A"), a change in the histogram 907 of the image for correction, with respect to the histogram 906 of the target image to be corrected, decreases even if a shape change appears due to the presence or absence of distortion.

Further, as can be seen from the histogram 904, when the comparison-target pixel block size is small (the areas "B"), a change in the histogram 909 of the image for correction, with respect to the histogram 908 of the target image to be corrected, increases even if a shape change appears due to the presence or absence of distortion. That is, when the block size is small, the property of histogram that is robust to a shape change of an object disappears.

However, it is not necessarily good to have a large size of the comparison-target pixel block.

Figure 3:
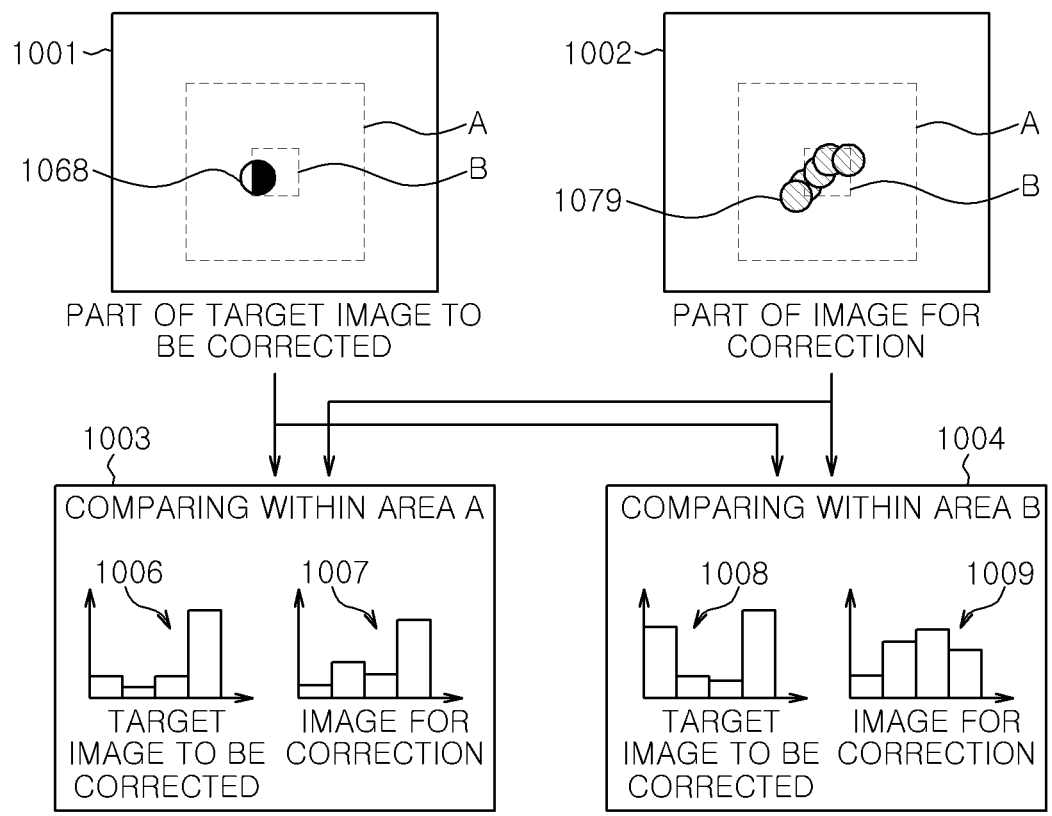
FIG. 3 is a view for explaining a case where a moving object (a moving subject) is not detected when a comparison-target pixel block size is large.

FIG. 3 is a view for explaining a case where a moving object is not detected when the comparison-target pixel block size is large. The view of FIG. 3 corresponds to that of FIG. 2 except that an image in the comparison-target pixel block is different. An input image 1001 in an upper part is an enlarged view of a part of an entire input image. A smoothed image 1002 in the upper part is an image obtained by smoothing a region of the input image 1001. Two areas "A" and "B" in the input image 1001 are the comparison-target pixel blocks. In the smoothed image 1002, the same two areas "A" and "B" are set at positions corresponding to those in the input image 1001.

In a histogram 1003 in a lower part of FIG. 3, the areas "A" are set as the comparison-target pixel blocks, and in a histogram 1004, the areas "B" are set as the comparison-target pixel blocks. The histogram 1006 is calculated by the image correcting unit 14 in a case where the area "A" in the input image 1001 is set as the comparison-target pixel block. The histogram 1007 represents a case where the area "A" in the smoothed image 1002 is set as the comparison-target pixel block. The histogram 1008 represents a case where the area "B" in the input image 1001 is set as the comparison-target pixel block. The histogram 1009 represents a case where the area "B" in the smoothed image 1002 is set as the comparison-target pixel block.

As can be seen from the histogram 1003, when the comparison-target pixel block size is large (the areas "A"), a difference in a shape change due to the presence or absence of distortion is small between the histogram 1007 of the image for correction and the histogram 1006 of the target image to be corrected.

Further, as can be seen from the histogram 1004, when the comparison-target pixel block size is small (the areas "B"), a difference in a shape change due to the presence or absence of distortion is large between the histogram 1009 of the image for correction and the histogram 1008 of the target image to be corrected.

There are known a few methods of calculating the difference or similarity between two histograms. Among them, for example, the normalized histogram intersection or the Bhattacharyya coefficient may be used.

The histograms in FIG. 3 show the characteristic of histogram for a moving object. However, when the block size is set large, the difference between the histograms becomes small, which is almost similar to the histograms for a motionless object in FIG. 2, so that it is not possible to detect a moving object.

However, in the input image 1001 of FIG. 3, a moving object 1068 is certainly displayed.

The object 1068 is picked up as an image having a blur (mainly, by an effect of multiple exposure) that is a sort of distortion, as represented by an object 1079, by being smoothed.

The moving object 1068 merely exists at one point in each frame (image), but when a plurality of frames is smoothed, the moving object 1068 is displayed as a blurred image like the object 1079 in the smoothed image 1002. That is, as the comparison-target pixel block size is relatively increased with respect to the object 1068, the effect of a change in a pixel value due to the movement of the object on the shape of histogram is decreased, so that it becomes difficult to distinguish the movement of the object from the influence of air fluctuations. For this reason, if the degree of time smoothing is controlled by determining a moving object based on simple comparison between histograms, a smear may be easily formed at the contours of the moving object. Moreover, a small object may not be determined as an object and covered up by a time-smoothed image.

The error detection and overlooking of a moving object have a trade-off relationship with the comparison-target pixel block size. The comparison-target pixel block size for analysis needs to be larger than a displacement amount of fluctuations (degree of distortion). However, as long as it is satisfied, it is better to make the comparison-target pixel block size as small as possible.

Embodiment 1

As described above, it is understood that in order to detect a moving object by using histogram under an air-fluctuating environment, the comparison-target pixel block size for analysis is an important parameter that affects the correction of distortion. In this case, a proper parameter is determined by the degree of distortion in an image. In an embodiment 1, the degree of correction is automatically controlled by automatically detecting the degree of distortion caused by air fluctuations in an image. Further, the effect of image degradation by the correction of distortion is minimized.

Figure 4:
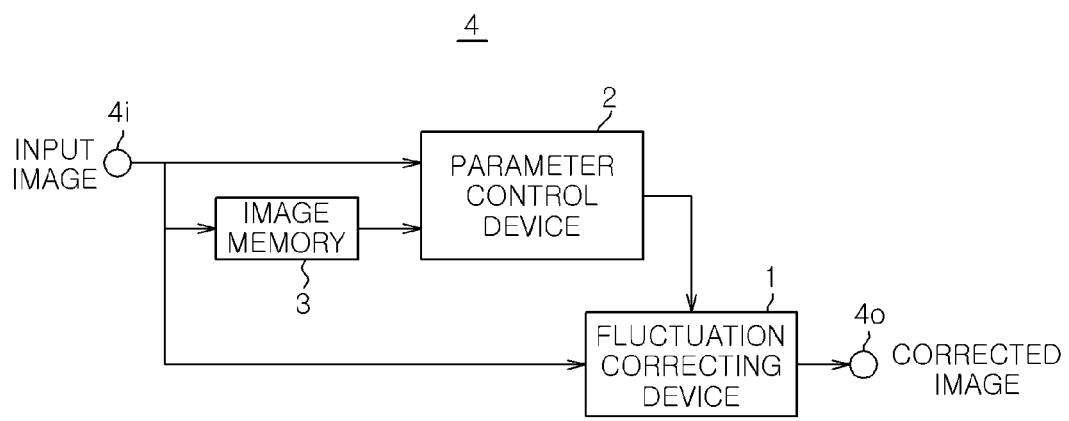
FIG. 4 is a block diagram of an image processing apparatus 4 in accordance with an embodiment 1.

FIG. 4 is a block diagram showing a schematic configuration of an image processing apparatus 4 in accordance with the embodiment 1. The image processing apparatus 4 is obtained by adding a parameter control device 2 and an image memory 3 to a fluctuation correcting device 1 which will be described with reference to FIG. 8 (in an embodiment 3 to be described later). The parameter control device 2 automatically sets a parameter suitable for an input image. The parameter includes the above-described comparison-target pixel block size.

In FIG. 4, a plurality of input images taken in time series is inputted to an input unit 4i. The input unit 4i sequentially outputs the input images to the parameter control device 2, the image memory 3 and the fluctuation correcting device 1.

The image memory 3 accumulates the input images and provides to the parameter control device 2 images of a predetermined frame number among the accumulated images. The predetermined frame number is, e.g., the number of frames that the parameter control device 2 and the fluctuation correcting device 1 use in a time smoothing process to prepare an image for correction.

The parameter control device 2 generates a time-smoothed image from the previous input images accumulated in the image memory 3. Thereafter, the parameter control device 2 obtains a parameter from an input image (that is a target image to be corrected by the fluctuation correcting device 1) and the generated time-smoothed image and outputs the parameter to the fluctuation correcting device 1. The parameter is, e.g., a size of a pixel block to be compared in histogram and the like in the fluctuation correcting device 1.

The fluctuation correcting device 1 performs a distortion correction process on the input image based on the parameter inputted from the parameter control device 2, and makes and stores a high resolution image. Further, the fluctuation correcting device 1 outputs the high resolution image to the outside through an output unit 4o.

The image memory 3 may use a memory 90 included in the fluctuation correcting device 1. If the parameter control device 2 appropriates the time-smoothed image generated in the fluctuation correcting device 1, the image memory 3 is unnecessary.

The parameter control device 2 calculates a plurality of indices having different robustness with respect to deformation of an object caused by air fluctuations, from the comparison-target pixel blocks of the target image to be corrected and the image for correction. All indices are affected by a change in a pixel value due to the movement of an object.

An index having a robust characteristic to the deformation of an object is, e.g., one of a kind that sums up and compares a plurality of pixels as a bin. As one of that kind, there is a similarity of the abovementioned histogram. In a case of directly summing up pixel values in a pixel block, it is possible to obtain a strong characteristic on the shape change of an object by scaling down a target image to be corrected and an image for correction and then comparing the pixel values. Alternatively, there may be used histogram obtained by summing up a direction or pattern of gradient of pixel values.

An index that is not robust to the shape of an object is, e.g., one of a kind that compares individual pixel values directly, and as one of that kind, there is SAD (sum of absolute difference).

Figure 5:
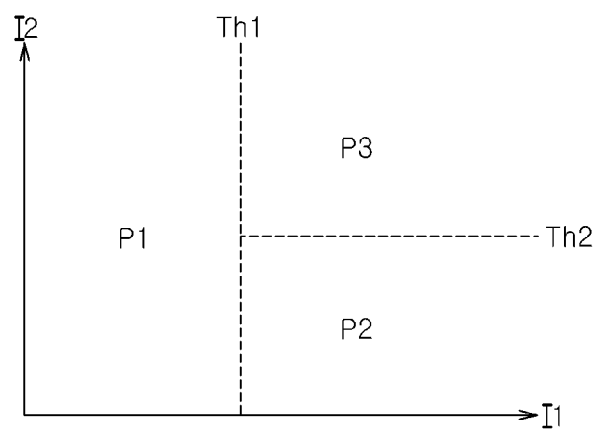
FIG. 5 is a schematic view showing a method of classifying distribution of two different indices calculated by a parameter control device 2 of the embodiment 1.

FIG. 5 shows a method of classifying distribution of two different indices. The parameter control device 2 estimates the relationship between a state of an object in a comparison-target pixel block and a size of the comparison-target pixel block based on the relationship of the two different indices shown in FIG. 5.

In FIG. 5, the horizontal axis indicates an index I1 and the vertical axis indicates an index I2. The index I1 represents a change in a pixel value due to the movement of an object. The index I2 is a histogram-based index that is robust to the deformation of an object.

The index I1 can be divided into a state P1 and other states by a threshold value Th1. The index I2 can be divided into a state P2 and a state P3 by a threshold value Th2. For example, when I1<Th1, the state becomes P1;
when I1≥Th1 and I2<Th2, the state becomes P2; and
when I1≥Th1 and I2≥Th2, the state becomes P3.

Under a proper threshold value, the state P1 is a region considered as a background, the state P2 is a region considered that air fluctuations are being generated or an image of a minute moving object is being taken, and the state P3 is a region considered as a moving object.

The parameter control device 2 of this example finds a suitable size for the comparison-target pixel block based on the above relationship. Since the threshold values Th1 and Th2 depend on the comparison-target pixel block size from which the indices are obtained, it is preferable that the threshold values Th1 and Th2 are properly determined depending on the comparison-target pixel block size.

Figure 6:
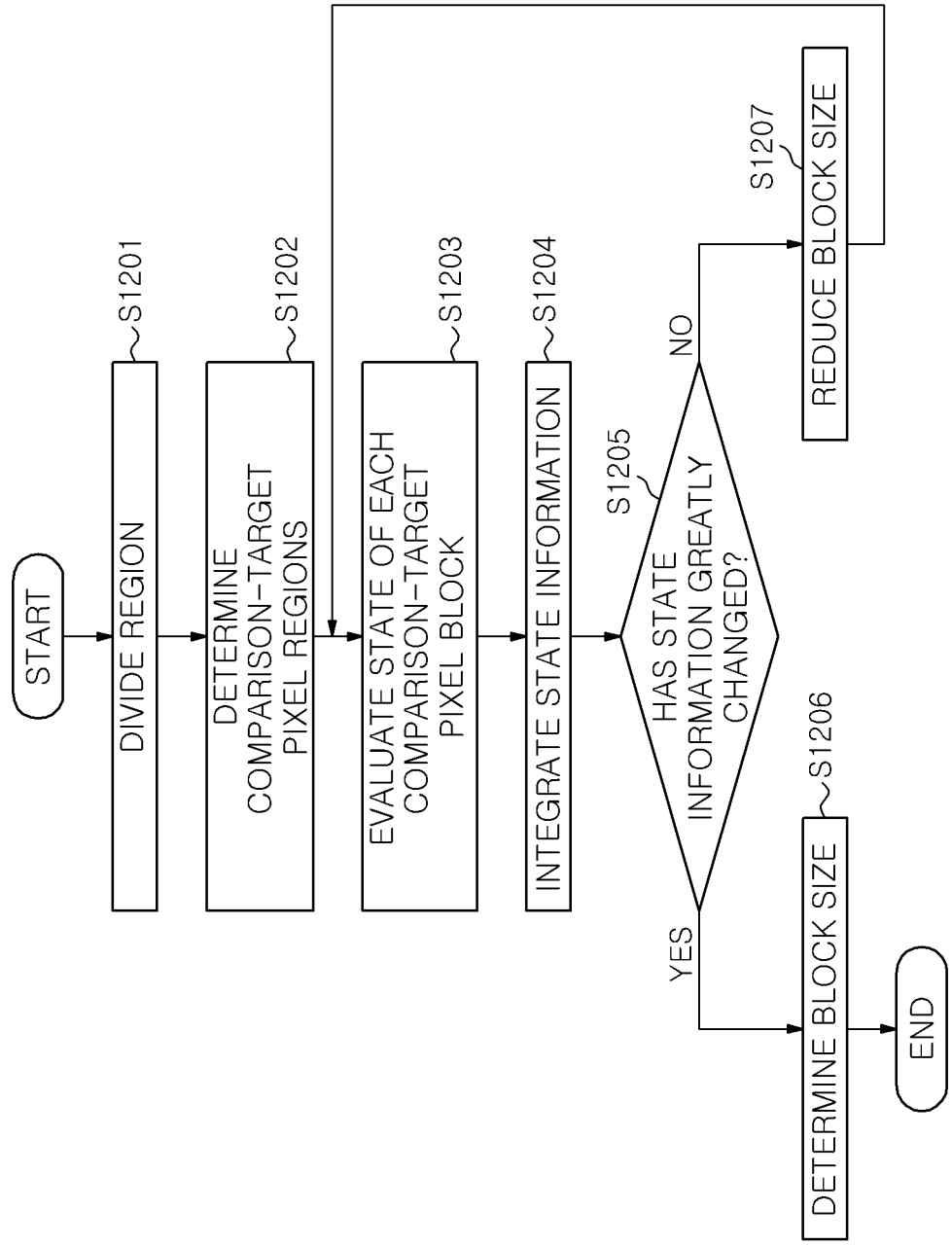
FIG. 6 is a flow chart showing a sequence of optimizing the comparison-target pixel block size by using the parameter control device 2 of the embodiment 1.

FIG. 6 shows a flow chart of a process for optimizing the comparison-target pixel block size. By performing the process in sequence, the parameter control device 2 can correct fluctuations having a width below a given maximum width, and can minimize overlooking a moving object. Before performing the process of FIG. 6, as an initial setting, as described in FIG. 5, states to be classified and a threshold value of each index for classification are previously defined.

First, in a region dividing step S1201, a maximum width of air fluctuations is roughly calculated based on the pixel displacement amount and the like caused by the fluctuations. Thereafter, an image is divided into blocks in a lattice form so as to have a predetermined width (block size) larger than the calculated maximum width.

That is, in the region dividing step S1201, a region is virtually (logically) divided in a rough grain size larger than the fluctuation width. The virtual division makes it possible to easily access an image in an image block unit. It is enough if it can be logically treated in that way. It may be good to divide a moving object from a background at this point. At this time, by scaling down the image to a size equal to or greater than the fluctuation width, it is possible to detect a rough moving object while moderating the influence of fluctuations.

Next, in a comparison-target pixel region determining step S1202, among the image blocks divided in the region dividing step S1201, some image blocks to be compared in a state evaluation, which will be later described, are selected. The image blocks to be compared may be uniformly extracted from the entire image or may be extracted much from a background and object in the vicinity of their boundary. As such, by restricting a region to be compared, it is expected that the accuracy in determining the comparison-target pixel block size is improved and the amount of arithmetic operation is reduced.

Next, in a state evaluating step S1203, given pixel blocks (initially, the image blocks selected in step S1202) are set as comparison-target regions, and with respect to each of the comparison-target regions, as described in FIG. 5, each region is evaluated whether which state it is in based on the previously set indices and threshold values.

At this time, all pixels in each given pixel block are basically set as the comparison-target pixel block, but the pixels may be thinned out.

The evaluation is performed while reducing the size of the comparison-target pixel block in each loop (that starts from step S1203 and returns to step S1203 through steps S1205 and S1207) from a size value that can correct the fluctuations having a maximum width. That is, in a process after two loops, the comparison-target pixel block size reduced in step S1207 is applied.

Thereafter, in a state information integrating step S1204, information of the respective pixel blocks is integrated to calculate a value (integrated information) for determining whether the block size is suitable or not. In this example, a fluctuation rate of a proportion (P2 proportion) that a region in the state P2 of FIG. 5 occupies in an image is calculated as the integrated information. In a case where the comparison-target pixel block size is the initial maximum value, a region having air fluctuations and a region having a minute movement are determined as being in the state P2 and thus a proportion of P2 is high.

Next, in an integrated information determining step S1205, if the integrated information (e.g., the fluctuation rate) calculated in the state information integrating step S1204 has changed by a predetermined rate or more compared to previous integrated information, the flow goes to a branched process that is a block size determining step S1206. On the other hand, if the integrated information has changed merely by a value below the predetermined rate compared to the previous integrated information, the flow goes to a branched process that is a block size reducing step S1207. Further, if the previous integrated information does not exist (step S1205 immediately after the integrated information is calculated for the first time in step S1204), the flow goes to the branched process that is the block size reducing step S1207.

In the block size reducing step S1207, the comparison-target pixel block size is set smaller by a predetermined rate than the previous block size, and the reduced size is set as a new comparison-target pixel block size. Thereafter, the flow proceeds to the state evaluating step S1203.

As such, in steps S1203, S1204 and S1206, the comparison-target pixel block size becomes smaller, and in a case where a proportion of a region in the state P2 sharply changes, it is determined that the comparison-target pixel block size has become equal to or smaller than the fluctuation width. Thereafter, the flow goes to the block size determining step S1206. At this timing, a part of a region that stably belongs to the state P2 so far (a region having fluctuations but no moving object) becomes to belong to the state P3. Therefore, it can be considered that a rapid reduction in the proportion of the state P2 occurs.

In the block size determining step S1206, the comparison-target pixel block size at that time point is set as a definitive comparison-target pixel block size. The definitive block size is slightly smaller than the fluctuation width. A moving object and a part of air fluctuations are classified as the state P3.

The above process may be performed just once when starting the image processing apparatus, or may be performed at a predetermined time interval to update the comparison-target pixel block size at the predetermined time interval. The comparison-target pixel block size may be determined with respect to an entire image or with respect to each divided region in an entire image. Further, the comparison-target pixel block size may be determined whenever the classification between a background and a moving object is performed. A particular block size may be determined with respect to a region designated by a user (a region desired to be an especially clear image).

Moreover, the block size may be updated by external factor such as a change in zoom magnification of a camera that is photographing.

To sum up, the image processing apparatus of the embodiment 1 includes the input unit to which input images taken in time series are inputted, the image memory in which the input images are accumulated, the fluctuation correcting device and the parameter control device. The image memory outputs, to the parameter control device, images of a predetermined frame number among the accumulated input images. The parameter control device obtains a comparison-target pixel block size based on the input images and the images outputted from the image memory, and outputs the obtained comparison-target pixel block size to the fluctuation correcting device. The fluctuation correcting device prepares a time-smoothed image by using the input images taken in time series and makes histogram of the comparison-target pixel block size with respect to each pixel of a target image to be corrected in the input images and the time-smoothed image. Further, the fluctuation correcting device corrects the target image by changing a pixel correction amount for each pixel depending on the similarity between respective histograms. By doing so, the fluctuation correcting device distinguishes between a movement of a moving object and distortion in an image caused by air fluctuations in a stationary region due to a heat haze and the like, and corrects the distortion in the image.

In accordance with the embodiment 1, since a suitable comparison-target pixel block size can be automatically determined, it is possible to produce an image having a reduced distortion and improved resolution compared to the prior application 2.

Embodiment 2

Figure 7:
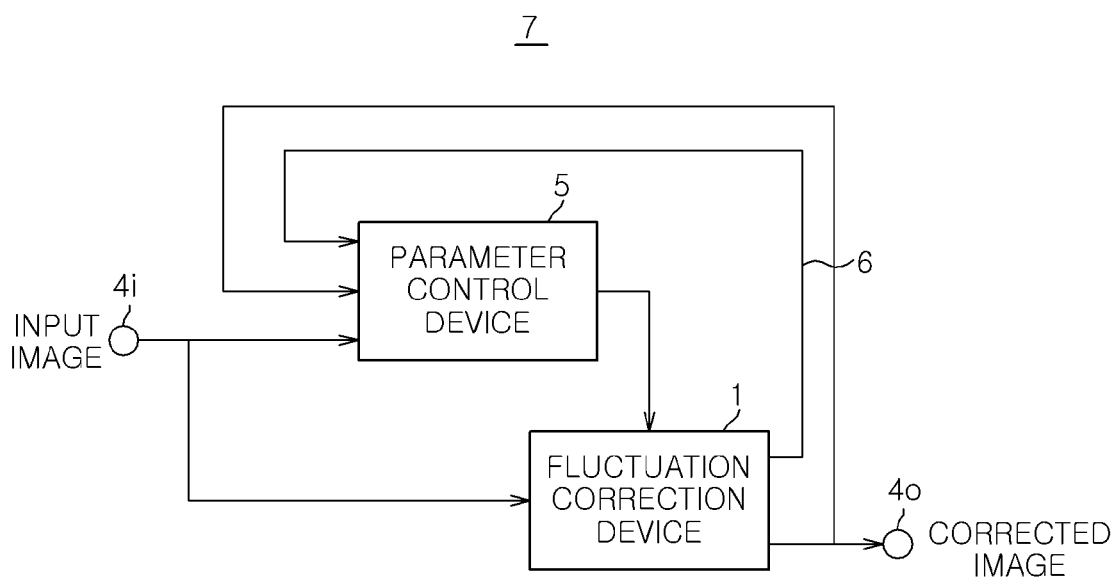
FIG. 7 is a block diagram showing a configuration of an image processing apparatus 7 in accordance with an embodiment 2.

An embodiment 2 of the present invention will be described with reference to FIG. 7. FIG. 7 is a block diagram showing a configuration of an image processing apparatus 7 in accordance with the embodiment 2. The image processing apparatus 7 is obtained by combining the fluctuation correcting device 1 identical to that of the embodiment 1 with a parameter control device 5. The parameter control device 5 performs an automatic setting of a parameter according to the flow chart of FIG. 6 by using two kinds of indices as in the embodiment 1.

In FIG. 7, a plurality of input images taken in time series is inputted to the input unit 4i. The input unit 4i provides the input images to the parameter control device 5 and the fluctuation correcting device 1. The parameter control device 5 performs a delay process if necessary in order to input and output an image at the right moment.

The fluctuation correcting device 1 performs a distortion correction process on the input images and makes a corrected image having high-resolution, based on parameter information inputted from the parameter control device 5.

The corrected image having high-resolution is outputted to the output unit 4o and the parameter control device 5. The fluctuation correcting device 1 feedbacks correction information 6 on the distortion correction process to the parameter control device 5. The correction information 6 may include previous input images or images for correction generated by smoothing the previous input images.

The parameter control device 5 obtains a parameter (comparison-target pixel block size) from an input image to be corrected and the corrected image outputted from the fluctuation correcting device 1, and outputs the parameter to the fluctuation correcting device 1. The parameter control device 5 uses the corrected image as a substitute of an averaged image and receives, as the correction information 6, a region having a moving object detected by the fluctuation correcting device 1 to use the correction information 6 in the control of the parameter. For example, when the comparison-target pixel regions are determined in step S1202 of FIG. 6, if a certain number of regions other than the region having the detected moving object are sampled, the comparison-target pixel regions become robust to the change in a proportion of the moving object in the image.

From this, with reference to FIGS. 8 to 14, the fluctuation correcting device 1 of the present embodiment 2 will be described in detail. The fluctuation correcting device 1 has been disclosed in the prior application 2 and can be applied to other embodiments. The image processing apparatus (the fluctuation correcting device 1) may be an apparatus that corrects fluctuations after separating a pixel displacement due to air fluctuations and a pixel displacement due to movement of an object as well as those disclosed in the prior applications 1 and 2, so that the image processing apparatus is not limited to those disclosed in the prior applications 1 and 2.

Figure 8:
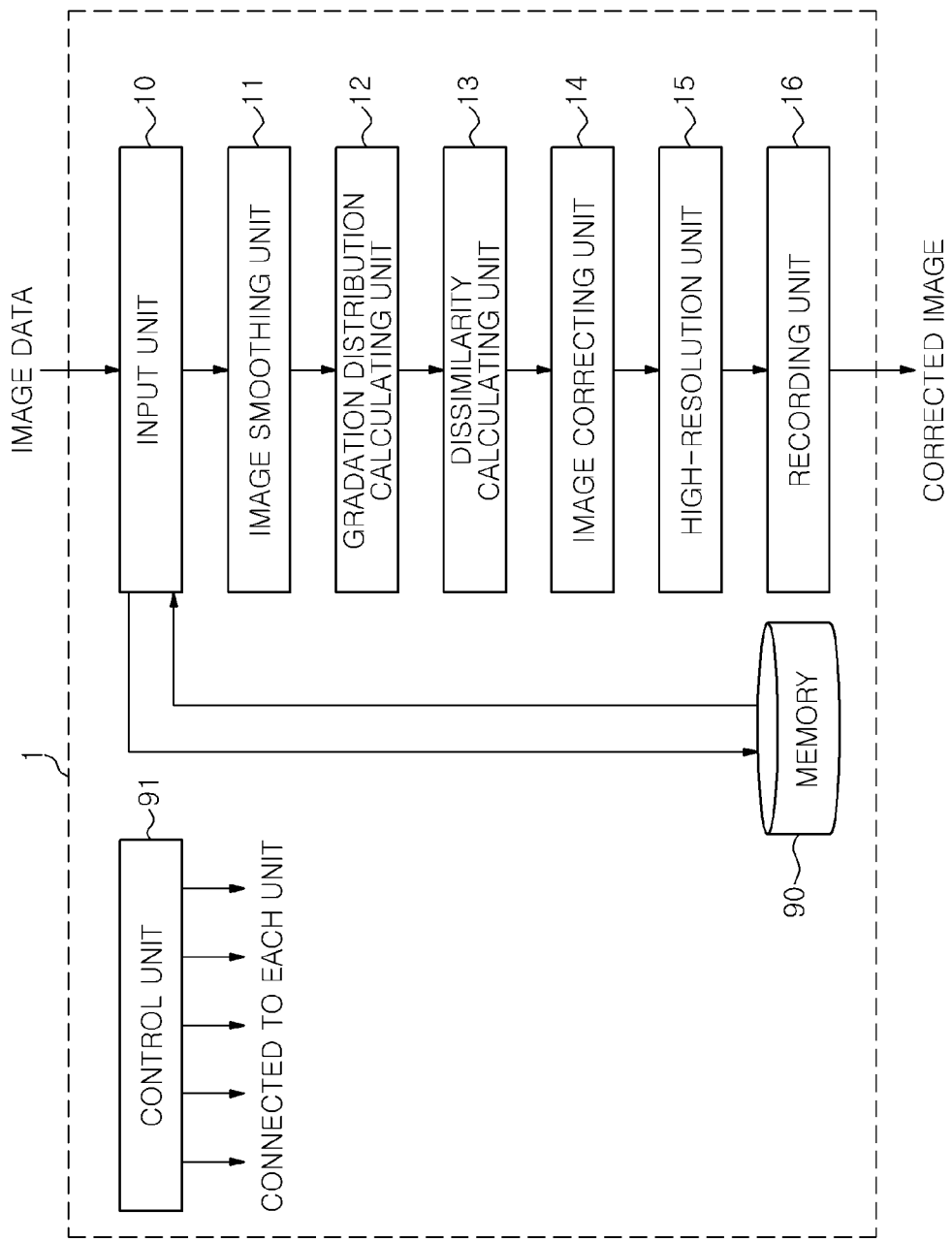
FIG. 8 is a functional block diagram of a fluctuation correcting device 1 of the embodiment 1 or 2.

FIG. 8 is a functional block diagram of an image processing apparatus in accordance with an embodiment 3 of the present invention. The image processing apparatus (the fluctuation correcting device 1) includes an input unit 10, an image smoothing unit 11, a gradation distribution calculating unit 12, a dissimilarity calculating unit 13, an image correcting unit 14, a high-resolution unit 15, a recording unit 16, and a control unit 91.

In FIG. 8, the input unit 10 receives moving image data taken in time series by an image pickup device (not shown). For example, the input unit 10 may include an image input terminal, a network connection terminal and the like, or may be a tuner for television broadcasting. The input unit 10 may continuously obtain still image data of JPEG format and the like taken in time series at a predetermined time interval by an image pickup device such as a surveillance camera and the like, and may store, as input images, a plurality of images of the past, present and future in a memory 90. Alternatively, the input unit 10 may pick out still image data at a predetermined time interval from compressed or uncompressed moving image data of MPEG, H.264, HD-SDI format and the like, and may store, as input images, a plurality of images of the past, present and future in the memory 90. The input unit 10 may acquire the input images of the past, present and future from the memory 90 by using DMA (direct memory access) and the like. Further, the input unit 10 may store in the memory 90 input images of the past, present and future previously stored in a detachable storage medium, as will be later described.

The input unit 10 sets an image at time t, which is a target image to be corrected, to a present image, an image before time t to a past image, and a new image after time t to a future image. Therefore, the input unit 10 performs a delay process as occasion demands. In other words, the image at time t is actually an earlier one than the present, and the "future image" includes an actual present (recent) image. The input unit 10 outputs the present image and the previous and subsequent images at the same pixel positions to the image smoothing unit 11.

The image smoothing unit 11 synthesizes in time series the images at the same pixel positions among the input images of the past, present (time t) and future, and creates a smoothed image corresponding to the image at time t. An example of creating the smoothed image will be later described with reference to FIG. 9.

With respect to each of the input image at time t and the smoothed image, the gradation distribution calculating unit 12 calculates gradation distribution for each image area having, as a center, a pixel of each image. This process is performed, at the same pixel positions, on each pixel in the input image at time t and the smoothed image. An example of the gradation distribution will be later described with reference to FIG. 10.

The dissimilarity calculating unit 13 calculates similarity or dissimilarity between the gradation distribution of the input image at time t and the gradation distribution of the smoothed image calculated by the gradation distribution calculating unit 12. An example of the dissimilarity between the gradation distributions will be later described with reference to FIG. 11.

The image correcting unit 14 corrects the input image at time t by synthesizing the input image at time t and the smoothed image. A ratio of the synthesis of both images is changed depending on the dissimilarity calculated by the dissimilarity calculating unit 13. By the above correction, a corrected image having a reduced distortion at time t is prepared. An example of the correction process will be later described with reference to FIGS. 11 and 12.

The high-resolution unit 15 creates a high-resolution image at time t from the corrected image at time t. An example of creating the high-resolution image will be later described with reference to FIG. 4.

The recording unit 16 stores the high-resolution image at time t in the memory 90 if the high-resolution image at time t in which a heat haze has been reduced is desired to be stored. If the high-resolution image at time t is not required to be stored, the input image is stored.

The recording unit 16 can convert the image stored in the memory 90 according to a mode. For example, when the mode is 1, the high-resolution image S created by the high-resolution unit 15 is stored in the memory 90, or the high-resolution image S is outputted to the outside of the fluctuation correcting device 1. When the mode is 0, the high-resolution image S is not stored in the memory 90 and the input image is outputted to the outside of the fluctuation correcting device 1.

The control unit 91 is connected to the respective components of the fluctuation correcting device 1. The respective components of the fluctuation correcting device 1 are operated autonomously or by the instruction of the control unit 91.

Figure 9:
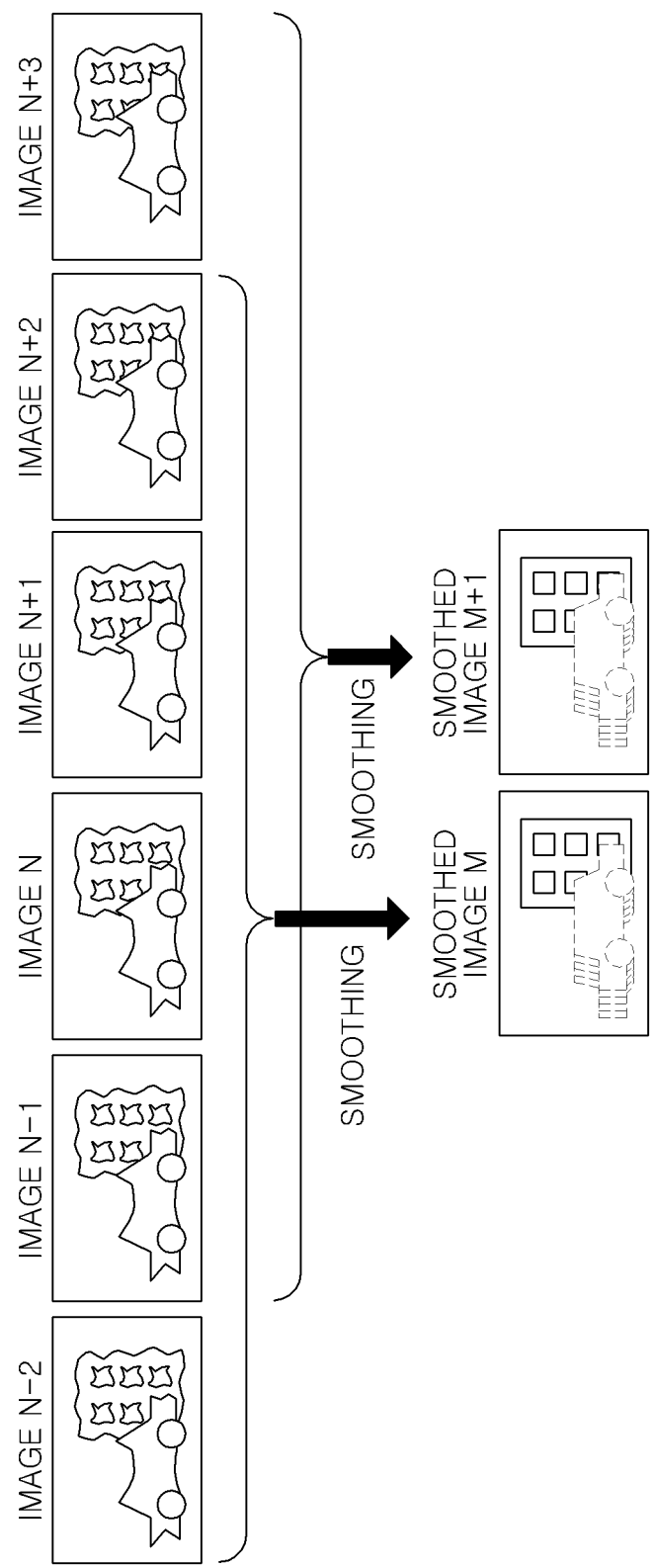
FIG. 9 is a view for explaining an operation example of an image smoothing unit 11.

FIG. 9 is a view for explaining an operation example of the image smoothing unit 11. In FIG. 9, as one example, an image N is set to a starting point, and a smoothed image is created by using past and future input images (images N−2, N−1, N+1 and N+2) and the present (time t) input image N (N is a natural number). In FIG. 9, the images N−2, N−1, N+1 and N+2 are displayed in time series, and time goes by from the left of the drawing sheet which is the past to the right of the drawing sheet which is the future. For example, if the image N is a present image (at time t), the left image N−1 is a past image and the image N−2 is a more past image. Also, if the image N is a present image, the right image N+1 is a future image and the image N+2 is a more future image.

On the coordinates (i, j), it is assumed that a pixel value of the image N−2 is q1(i, j), a pixel value of the image N−1 is q2(i, j), a pixel value of the image N is q3(i, j), a pixel value of the image N+1 is q4(i, j), and a pixel value of the image N+2 is q5(i, j). Further, it is assumed that a pixel value of a smoothed image M at the coordinates (i, j) is m(i, j), and p1 to p5 are weighted factors. The image smoothing unit 11 synthesizes the respective images by using the following Equation 1 to prepare the smoothed image M in which the respective images have been smoothed in time series.

In the coordinates (i, j), "i" indicates a pixel position in the horizontal direction on an image, and "j" indicates a pixel position in the vertical direction on an image.

$$m(i, j) = \sum_{i=1}^{D} (pi \times qi) \bigg/ \sum_{i=1}^{D} pi,$$ (Equation 1)

where D is the number of images used in the synthesis. If the number of images of the past, present and future is 5, a value of D in the Equation 1 is 5. The pixel value in the Equation 1 may have any type. For example, the pixel value may be a value of each channel in an arbitrary color space, i.e., R (red), G (green) and B (blue) in the RGB color space, or Y (luminance), Cb and Cr (color difference) in the YCbCr color space, or each component value in the HSV color space.

It is considered that the displacement amount of when an object is deformed by the influence of a heat haze has a tendency to depend on the Gauss distribution. For this reason, by smoothing pixels by using past and future images, it is possible to acquire an image close to an original shape of an object. Further, since an image that becomes a starting point is reconstructed by using past and future images in a limited range, it can be suppressed to be strongly affected by the past images, unlike a case of smoothing by repeatedly synthesizing the past images. Furthermore, even if a moving object exists in the input images, it is possible to create the smoothed image M including information for reducing image distortion of the moving object.

Figure 10:
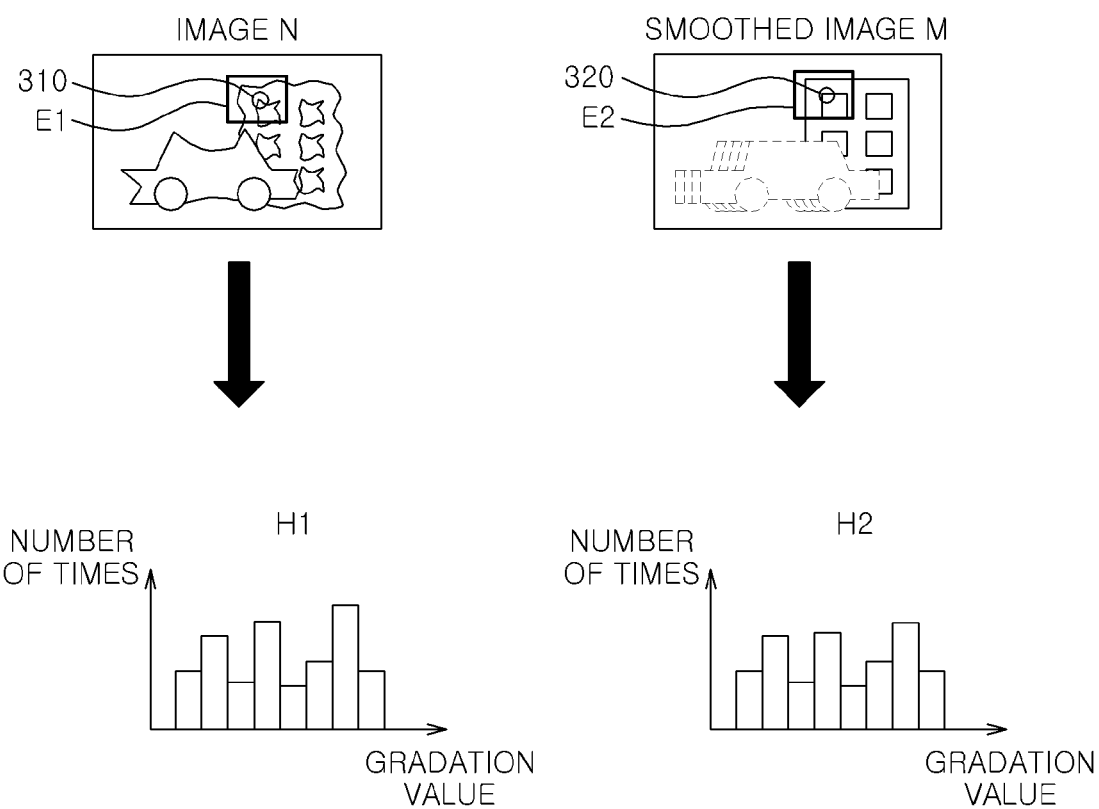
FIG. 10 is a view showing an operation of the gradation distribution calculating unit 12 that calculates gradation distribution by using pixels in a peripheral region of a target pixel.

FIG. 10 is a view showing an operation of the gradation distribution calculating unit 12 that calculates gradation distribution by using pixels in a peripheral region of a target pixel. The gradation distribution calculating unit 12 obtains histogram H1 indicating the gradation distribution of an image area E1 (e.g., 32 pixels×32 pixels) including a target pixel 310 in the input image N at time t. The gradation distribution calculating unit 12 also obtains histogram H2 indicating the gradation distribution of an image area E2 in the smoothed image M corresponding to the image area E1. Here, the image area E2 includes a pixel 320 in the smoothed image M corresponding to the target pixel 310. In the histograms H1 and H2, the horizontal axis indicates a gradation value and the vertical axis indicates the number of times that a gradation value appears. The horizontal axis and the vertical axis in other histograms to be described in the following also indicate the same component as in the histograms of FIG. 10.

Figure 11:
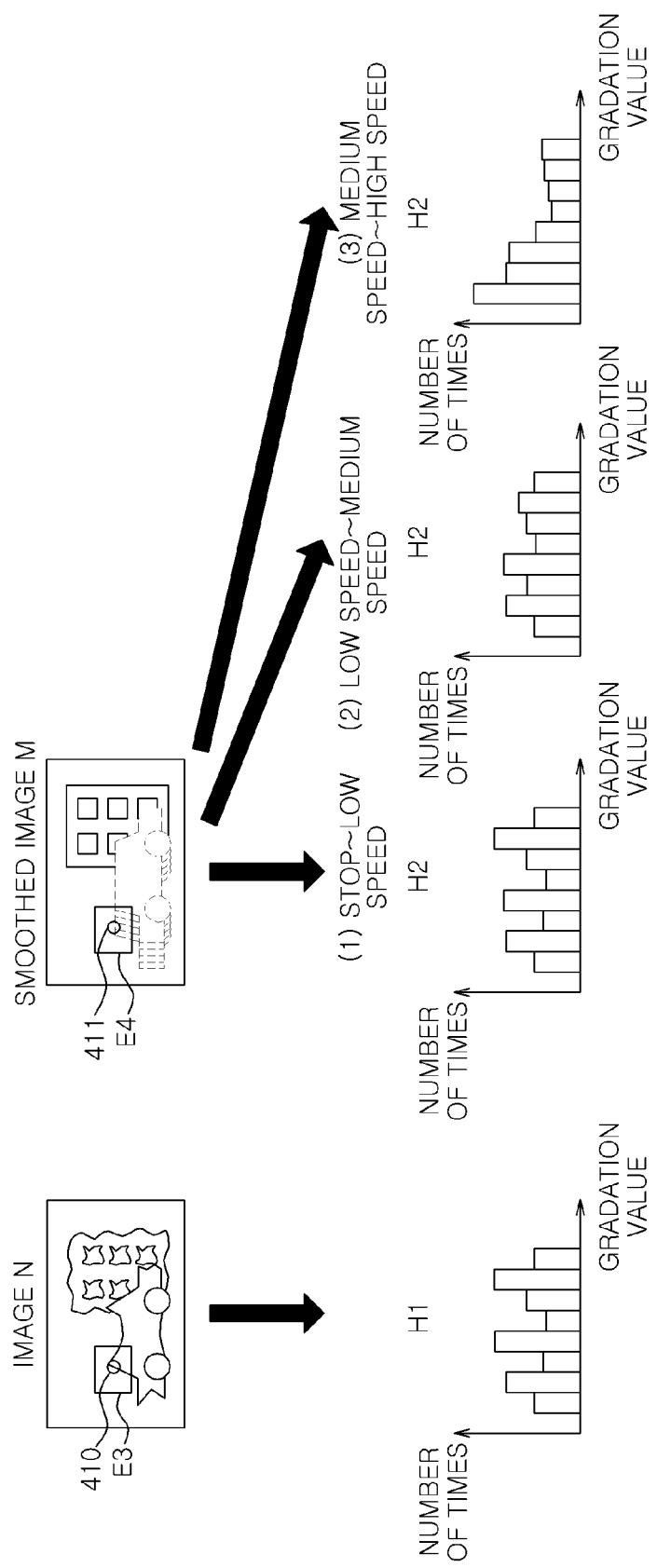
FIG. 11 is a view for explaining a change in histogram H2 depending on the state of a moving object included in past, present and future images.

FIG. 11 is a view for explaining a change in histogram H2 due to the movement of a moving object included in input images. Histogram for an image area E3 including a target pixel 410 in the image N is indicated by H1. Histogram H2 for an image area E4 including a target pixel 411 in the smoothed image M has a shape that varies depending on a speed of a moving object included in past, present and future images.

When the moving object stands still or moves at a low speed, as shown in (1) of FIG. 11, the histogram H2 becomes to have a similar shape to the histogram H1. When the moving object moves at a low speed to a medium speed, information on different patterns from the moving object is included. Therefore, as shown in (2) of FIG. 11, the histogram H2 has a slightly different shape from the histogram H1. When the moving object moves at a medium speed to a high speed, greatly different patterns from the moving object are much included. Therefore, as shown in (3) of FIG. 11, the histogram H2 has a greatly different shape from the histogram H1. Accordingly, the movement of the moving object in the image can be easily examined by comparing the histogram H1 for the image N and the histogram H2 for the smoothed image M.

The dissimilarity calculating unit 13 calculates dissimilarity between the gradation distributions calculated by the gradation distribution calculating unit 12, e.g., between the histograms described in FIGS. 10 and 11. For example, by using the following Equation 2, a distance B32(c) between histograms is found by using the Bhattacharyya distance for each RGB component. Square root of sum of squared distances is regarded as dissimilarity L. Since the dissimilarity L corresponds to the distance between histograms, as a value of L becomes smaller, the dissimilarity becomes higher. A symbol "c" in the Equation 2 indicates any one of the RGB components.

$$B32(c) = \sqrt{1 - \frac{1}{32} \sum_{I=0}^{31} \sqrt{HA(I) \times HB(I)}}$$ (Equation 2)

$$L = \sqrt{B32(r)^2 + B32(g)^2 + B32(b)^2},$$

where HA(I) indicates the number of times that gradation value I appears in histogram A, and a gradation number (the number of bins in histogram) is 32.

The gradation distribution calculating unit 12 prepares histograms of a plurality of versions having different gradation numbers and sums up dissimilarities between the histograms, thereby obtaining further reliable dissimilarity. That is, when calculating histograms H1 and H2 of an initial version (the gradation number is 32), adjacent gradations are integrated to generate a histogram of a new version having a reduced gradation number. This process is recursively performed until the gradation number becomes 2 to successively accumulate dissimilarities. Since distortion belonging to a range of a class width of dissimilarity is included in the same class, the dissimilarity is maintained low with respect to a heat haze of various fluctuation widths. Further, it is possible to accurately distinguish an image area deformed by a heat haze and an image area deformed by a moving object. This will be described below with a specific example.

It is preferable that the gradation distribution calculating unit 12 calculates histograms for all pixels and dissimilarities for all pixels. However, if it is required to reduce the calculation amount, a target pixel may be thinned out, and one target pixel may be set with respect to the pixel number of the image area E1.

Figure 12:
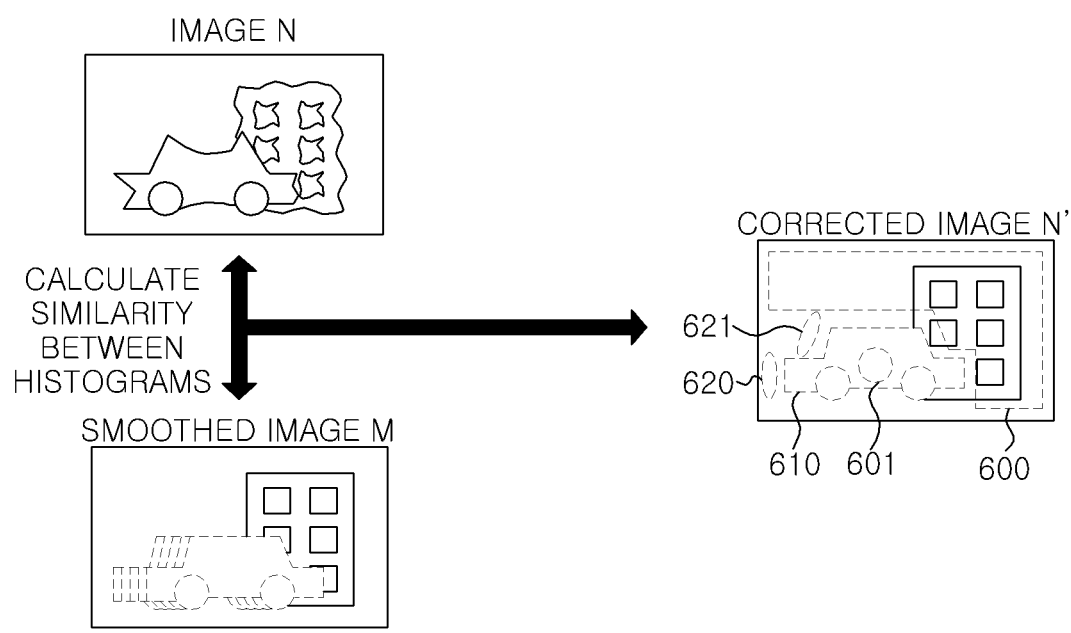
FIG. 12 is a view for explaining an operation of an image correcting unit 14.

FIG. 12 is a view for explaining an operation of the image correcting unit 14. The image correcting unit 14 determines a pixel value of a corrected image by using the input image N and the smoothed image M. Specifically, the image correcting unit 14 mixes the input image N with the smoothed image M while changing a ratio between them for each pixel by using the dissimilarity L and two threshold values T1 and T2 (T1<T2) calculated by the dissimilarity calculating unit 13. By doing so, the corrected image is obtained.

In the relationship between the dissimilarity L and the threshold values T1 and T2, if L≤T1 (dissimilarity between histograms is high), it corresponds to a case where an object in the image is stopped or moves at a low speed. For example, regions 600 and 601 in FIG. 12 belong to this case. The region 601 may actually move at a high speed, but a body of a vehicle having a low texture does not bring a change in the image, and thus the vehicle is treated as being stopped. In this case, the correction using the smoothed image M may as well be strongly made, so that a pixel value of the smoothed image M is set as a correction value as it is.

If T2<L, it corresponds to a case where an object moves at a medium speed to a high speed. For example, in regions 620 and 621 in FIG. 12, a moving object existed in the past but the object does not exist in the present and future by passing through. As such, in the case where an object moves at a medium speed to a high speed, if the correction is performed by using the smoothed image M, a blurred image in which the movement of the object has been smoothed is obtained. Accordingly, a pixel value of the input image N is set as the correction value without using the smoothed image M.

If T1<L≤T2, it corresponds to a case where an object in the image moves at a low speed to a medium speed. For example, a boundary of a chain line of a region 610 in FIG. 12 belongs to this case. Since this is an intermediate case with respect to the above two cases, a mixed value of respective pixel values of the input image N and the smoothed image M is set as the correction value by using the following Equation 3. When it is assumed that a pixel value of the image N on the coordinates (i, j) is n(i, j), a pixel value of the smoothed image M on the coordinates (i, j) is m(i, j), e(i, j)=m(i, j), and f(i, j)=n(i, j), a mixed value d(i, j) of the respective pixel values is indicated as follows.

$$d(i,j)=(1-R) \times e(i,j) + R \times f(i,j)$$

$$R=(L-T1)/(T2-T1) \quad \text{(Equation 3)}$$

When L≤T1, a mixing ratio R is regarded as 0, and when T2<L, the mixing ratio R is regarded as 1. If the dissimilarity L is not obtained for each pixel, the mixing ratio R of respective pixels is calculated by bilinear interpolation or low-pass filter by convolution of discrete R and sinc function.

Figures 13A, 13B:
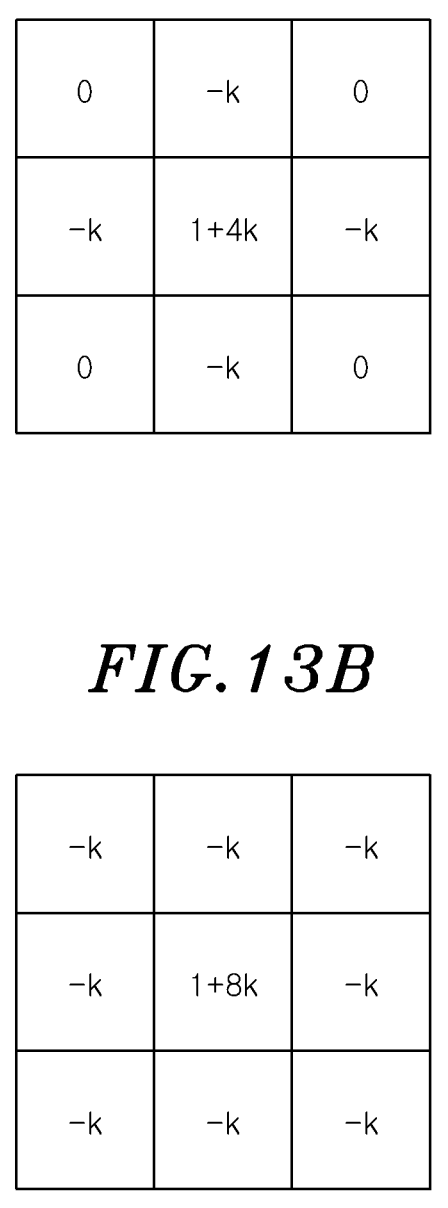

FIGS. 13A and 13B show a kernel of a sharpening filter used by the high-resolution unit 15. A section at the center corresponds to a target pixel, and a value in each section indicates a factor multiplied by a pixel at a corresponding position. The high-resolution unit 15 sharpens each pixel in the corrected image by using the filter kernel to create a high-resolution image S having an improved resolution.

Since there may be a case where resolution of the smoothed image M is degraded, with respect to a region having a small deformation like the regions 600 and 601 shown in FIG. 12, K in FIGS. 13A and 13B is set to, e.g., 1.0 to increase the degree of the sharpening. With respect to a boundary of a chain line of the region 610 shown in FIG. 12 which uses a mixed value of respective pixel values of the image N and the smoothed image M, K is set to, e.g., 0.75 which is an intermediate value. With respect to the regions 620 and 621 shown in FIG. 12 which uses a pixel value of the image N, K is set to, e.g., 0.5 so as not to emphasize noise. By performing the above-described process on all pixels, it is possible to create the high-resolution image S having an improved resolution while reducing distortion of an entire image including a stationary region and a moving object.

Figure 14:
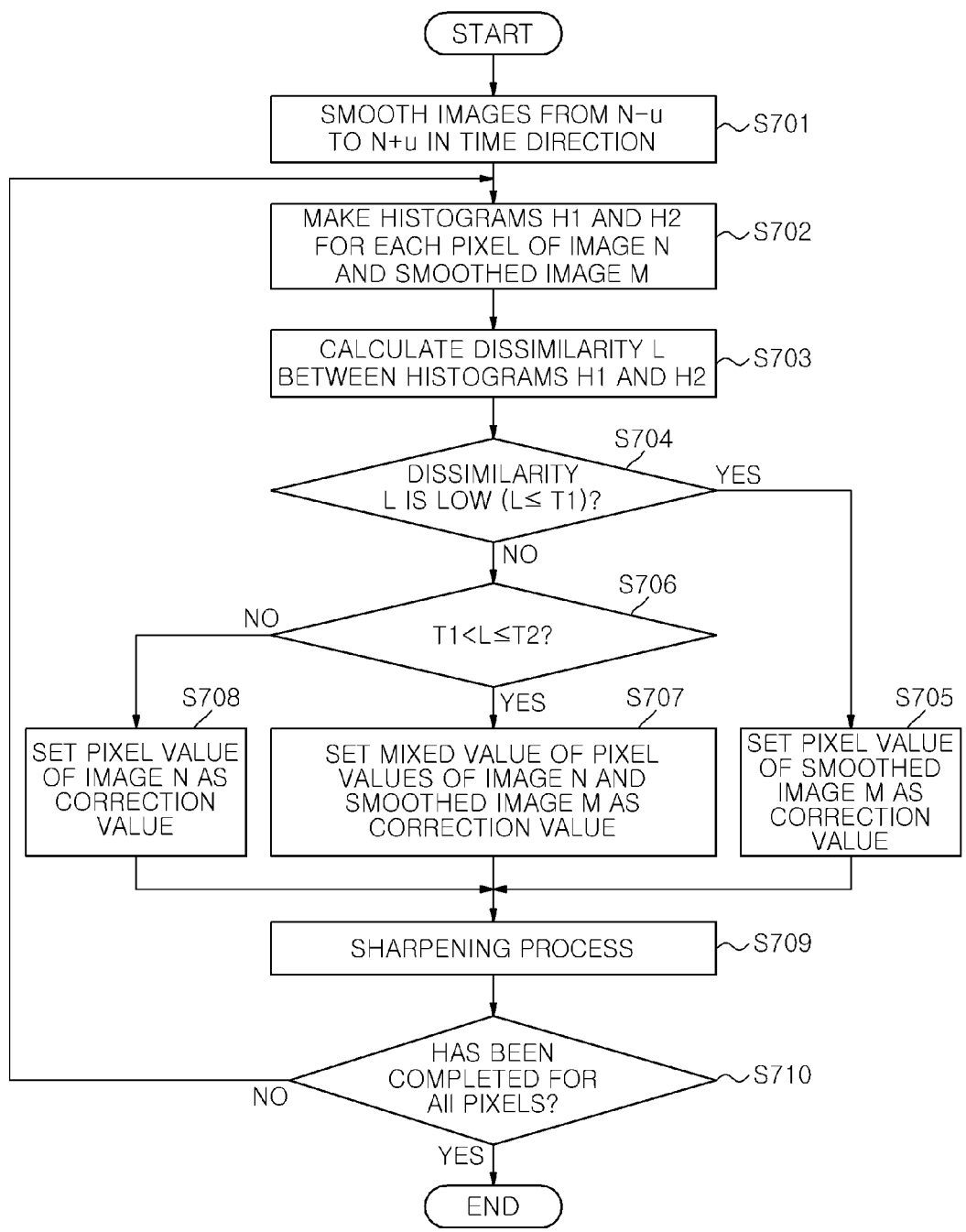
FIG. 14 is a flow chart showing a process operation of the fluctuation correcting device 1.

FIG. 14 is a flow chart showing an operation of the fluctuation correcting device 1. Hereinafter, each step of FIG. 14 will be described.

In step S701, the input unit 10 receives past, present and future image frames and outputs them to the image smoothing unit 11. The image smoothing unit 11 outputs a smoothed image M. If the total number of the past, present and future images is 5, an index "u" in step S701 becomes 2.

In step S702, the gradation distribution calculating unit 12 calculates histograms H1 and H2 for each pixel of an image N and the smoothed image M, respectively.

In step S703, the dissimilarity calculating unit 13 calculates dissimilarity L between the histograms H1 and H2.

In step S704, the image correcting unit 14 compares the dissimilarity L with each of threshold values (T1 and T2). If L≤T1, the flow goes to step S705. If T1<L, the flow goes to step S706.

In step S705, the image correcting unit 14 sets a pixel value of the smoothed image M as a correction value.

In step S706, the image correcting unit 14 determines whether the relationship between the dissimilarity L and the threshold values T1 and T2 satisfies T1<L≤T2. If the above condition is satisfied, the flow goes to step S707, and if not (L≤T1 or T2<L), the flow goes to step S708.

Since the processes in steps S704 and S706 merely determine whether the relationship between the dissimilarity L and the threshold values T1 and T2 satisfies T1<L≤T2, the processes may not be necessarily performed in that sequence. For example, in a process step that combines step S704 with step S706, if L≤T1, the flow goes to step S705, if T1<L≤T2, the flow goes to step S707, and if T2<L, the flow goes to step S708.

In a case where the condition of step S706 is satisfied, in step S707, the image correcting unit 14 sets a mixed value, obtained by mixing pixel values of the image N and the smoothed image M based on the Equation 3, as the correction value.

In a case where the condition of step S706 is not satisfied, in step S708, the image correcting unit 14 sets a pixel value of the image N as the correction value.

In step S709, the high-resolution unit 15 creates a high-resolution image S by improving resolution of a corrected image N' obtained by the image correcting unit 14.

In step S710, the image correcting unit 14 and the high-resolution unit 15 repeat the processes in steps S702 to S709 until the correction value and a pixel value of a resolution-improved pixel are obtained for all pixels in a target image.

The dissimilarity calculating unit 13 in this example estimates a speed of a moving object to classify pixels by using only histogram-based dissimilarity L. However, the dissimilarity calculating unit 13 may classify pixels by using two kinds of indices, as in the parameter control device 5.

Embodiment 3

Figure 15:
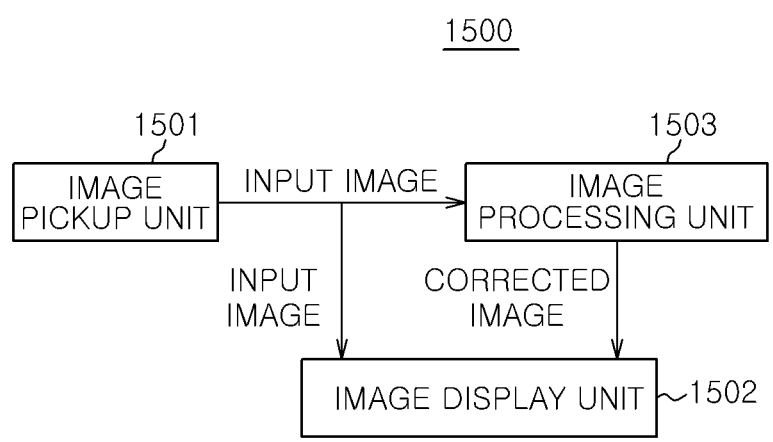
FIG. 15 is a functional block diagram of an image pickup device 1500 in accordance with an embodiment 3.

FIG. 15 is a functional block diagram of an image pickup device 1500 in accordance with an embodiment 3 of the present invention. The image pickup device 1500 includes an image pickup unit 1501, an image processing unit 1503 and an image display unit 1502. The image pickup unit 1501 is an image pickup device which receives light from an object and converts the received optical image to image data. The image processing unit 1503 is the image processing apparatus 4 of the embodiment 1 or the image processing apparatus 7 of the embodiment 2. The image processing unit 1503 receives the image data taken by the image pickup unit 1501 and corrects distortion caused by air fluctuations due to a heat haze. The image display unit 1502 is a device such as a display which displays a corrected image outputted from the image processing unit 1503.

The image display unit 1502 converts a display image according to an operation mode. For example, when the mode is 1, the image display unit 1502 displays the corrected image in which distortion caused by air fluctuations due to a heat haze has been reduced. When the mode is 0, the image display unit 1502 displays an input image as it is.

In the image pickup device 1500 in accordance with the embodiment 3, it is possible to provide a photographer with a corrected image in which distortion caused by air fluctuations due to a heat haze has been reduced in an entire image including both of a stationary region and a moving object.

Embodiment 4

Figure 16:
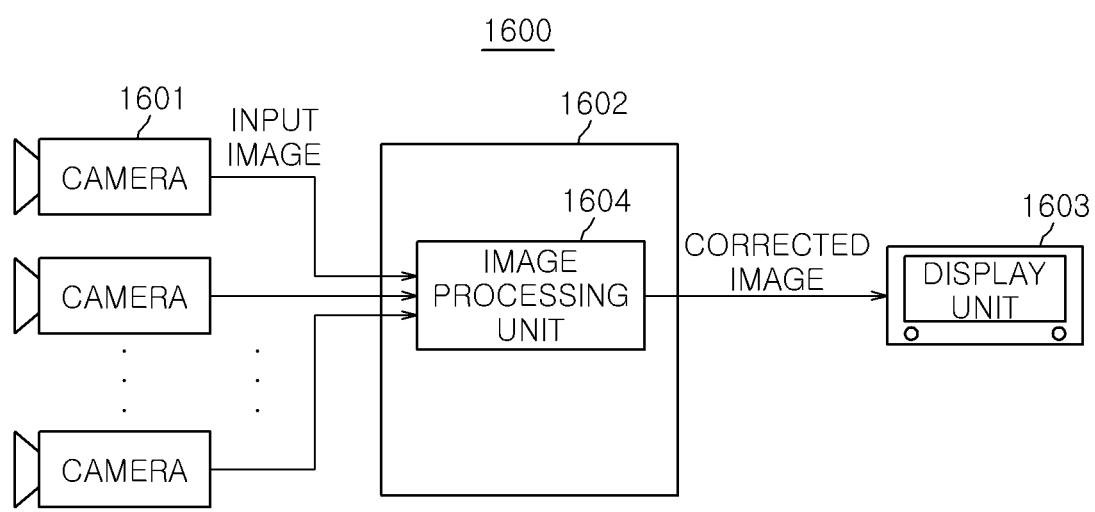
FIG. 16 is a functional block diagram of a surveillance system 1600 in accordance with an embodiment 4

FIG. 16 is a functional block diagram of a surveillance system 1600 in accordance with an embodiment 4 of the present invention. The surveillance system 1600 includes an image pickup unit 1601, an image processing unit 1604, a server 1602 and a display unit 1603. The image pickup unit 1601 is an image pickup device such as one or more surveillance cameras which pick up image data. The image processing unit 1604 is the image processing apparatus 4 of the embodiment 1 or the image processing apparatus 7 of the embodiment 2. The image processing unit 1604 receives the image data taken by the image pickup unit 1601 and corrects a heat haze. The server 1602 is a computer including the image processing unit 1604. The display unit 1603 is a device such as a display which displays a corrected image outputted from the image processing unit 1604.

A connection can be made between the image pickup unit 1601 and the server 1602 and between the server 1602 and the display unit 1603 through a network such as internet or the like, according to the physical arrangement or the like between a target place and the surveillance operator.

In the surveillance system 1600 in accordance with the embodiment 4, it is possible to provide a surveillance operator with a corrected image in which distortion caused by air fluctuations due to a heat haze has been reduced in an entire image including both of a stationary region and a moving object.

Embodiment 5

Figure 17:
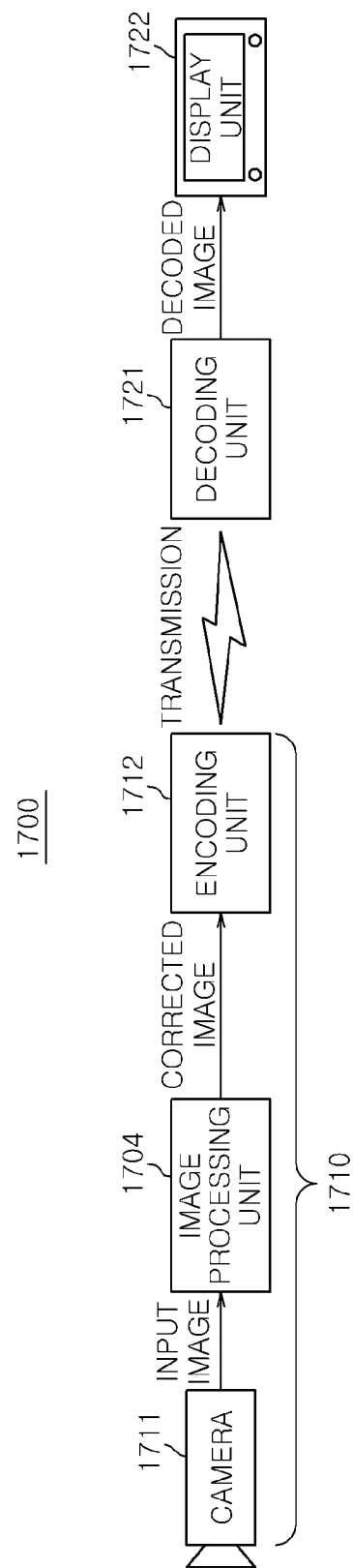
FIG. 17 is a functional block diagram of an encoding-decoding system 1700 in accordance with an embodiment 5.

FIG. 17 is a functional block diagram of an encoding-decoding system 1700 in accordance with an embodiment 5 of the present invention. The encoding-decoding system 1700 includes an encoding device 1710, a decoding unit 1721 and a display unit 1722. The encoding device 1710 includes an image pickup unit 1711, an image processing unit 1704, and an encoding unit 1712.

The image pickup unit 1711 is an image pickup device such as a surveillance camera or the like which picks up image data. The image processing unit 1704 is the image processing apparatus 4 of the embodiment 1 or the image processing apparatus 7 of the embodiment 2. The image processing unit 1704 receives the image data taken by the image pickup unit 1711 and corrects a heat haze. The encoding unit 1712 encodes corrected image data outputted from the image processing unit 1704 and transmits the corrected image data to the decoding unit 1721 through a network. The decoding unit 1721 decodes the transmitted corrected image data. The display unit 1722 displays the image decoded by the decoding unit 1721.

In the encoding-decoding system 1700 in accordance with the embodiment 5, it is possible to display a decoded image in which distortion caused by air fluctuations due to a heat haze has been reduced in an entire image including both of a stationary region and a moving object. Moreover, by reducing distortion caused by air fluctuations due to a heat haze in an image, a difference between images that needs to be transmitted by the encoding unit 1712 becomes small, thereby improving encoding efficiency.

An image correcting method of the present embodiments may perform an extensive correction to an image distortion and the like generated by, e.g., fluctuations of water surface, shaking of trees, fog in the atmosphere and underwater photographing other than a heat haze. Further, the image correcting method of the present embodiment may be widely used with the purpose of improving visibility by stopping an irregularly shaking object.

A moving object separation method by a region division in the present embodiments may be used for other purposes apart from the image correction. For example, in a system which automatically detects an intruder from a surveillance image including distortion by a heat haze and the like or automatically identifies the number of an entering vehicle, a processing amount can be reduced by analyzing a region identified as a moving object In the embodiments 1 to 5, each configuration, function, processing unit, processing means and the like may be realized with hardware by designing a part or the whole of them as an integrated circuit and the like. Further, in the above embodiments, each configuration, function and the like may be realized with software by interpreting and executing programs that implement respective functions by using a processor. Information on the programs that implement respective functions, tables, files and the like may be stored in a storage device such as a memory, hard disk, SSD (solid state drive) or the like, or in a non-transitory storage medium such as IC card, SD card, DVD and the like.

DESCRIPTION OF REFERENCE NUMERALS

1: fluctuation correcting device
4, 7: image processing apparatus
2, 5: parameter control device
3: image memory
4*i*: input unit
4*o*: output unit
6: correction information
10: input unit
11: image smoothing unit
12: gradation distribution calculating unit
13: dissimilarity calculating unit
14: image correcting unit
15: high-resolution unit 16: recording unit
91: control unit
1111: removal image generation unit
1500: image pickup device
1600: surveillance system
1700: encoding-decoding system

What is claimed is:

1. An image processing apparatus, comprising:
an input unit to which input images taken in time series are inputted;
an image memory in which the input images are accumulated;
a fluctuation correcting device; and
a parameter control device,
wherein the image memory outputs, to the parameter control device, images of a predetermined frame number among the accumulated input images,
the parameter control device obtains a comparison-target pixel block size based on the input images and the images outputted from the image memory and outputs the obtained comparison-target pixel block size to the fluctuation correcting device; and
the fluctuation correcting device prepares a time-smoothed image by using the input images taken in time series, makes histogram of the comparison-target pixel block size with respect to each pixel of a target image to be corrected in the input images and the time-smoothed image, and corrects the target image by changing a pixel correction amount for each pixel depending on similarity between the histograms.

2. An image processing apparatus, comprising:
an input unit configured to receive a plurality of input image frames taken in time series;
a gradation distribution calculating unit configured to calculate a first gradation distribution for a first image area in a target frame to be corrected among the image frames, and calculate a second gradation distribution for a second image area, corresponding to the first image area, in a frame for correction used for correcting the target frame;
a parameter control unit configured to calculate a set of two indices having different robustness to deformation of an object from the target frame and the frame for correction, and control sizes of the first and the second image area based on relationship between the two indices;
a similarity calculating unit configured to calculate a first similarity between the first gradation distribution and the second gradation distribution;
an image correcting unit configured to correct the target frame by using the frame for correction; and
an output unit configured to output the target frame corrected by the image correcting unit,
wherein the image correcting unit corrects the target frame by using the frame for correction after changing a using ratio between the target frame and the frame for correction depending on the first similarity.

3. The image processing apparatus of claim 2, wherein one index in the set is a first index based on a difference between a plurality of pixels in the first and the second image area, and the other index in the set is a second index based on a difference between individual pixels in the first and the second image area.

4. The image processing apparatus of claim 2, wherein one index in the set is a first index based on a difference between histograms of a pixel value in the first image area and the second image area, and the other index in the set is a second index based on a sum of absolute differences between pixel values in the first and the second image area.

5. The image processing apparatus of claim 3, wherein the parameter control unit sets a first and a second threshold value corresponding to the first and the second index, calculates a plurality of the sets from the first and the second image area provided at a plurality of positions in the image frames, and controls the sizes of the first and the second image area based on the number of sets in which the first index is equal to or higher than the first threshold value and the second index is lower than the second threshold value.

6. An image processing method, comprising:
an initial setting step of defining a target image to be compared as a comparison-target pixel block, and providing a first index that is not robust to deformation of an object, a first threshold value for dividing the comparison-target pixel block to a first state and other states by using the first index, a second index that is robust to deformation of the object, and a second threshold value for dividing the other states to a second state and a third state by using the second index;
an input step of obtaining a plurality of images taken in time series;
a region dividing step of calculating a maximum width of air fluctuations from a pixel displacement amount by the fluctuations and dividing an image to regions of a block size having a predetermined width larger than the calculated maximum width;
a comparison-target pixel region determining step of determining a comparison-target image among a target image to be corrected and an image for correction in order to determine a comparison-target pixel block size;
a state evaluating step of defining all pixels in the comparison-target image as the comparison-target pixel block, and evaluating the defined comparison-target pixel block whether which state it is in based on the first index, the second index, the first threshold value and the second threshold value;
a state information integrating step of integrating information of respective pixel blocks to calculate integrated information for determining whether the block size is suitable or not;
an integrated information determining step of determining whether the integrated information changes by a predetermined rate or more compared to previous integrated information;
a step of, if the integrated information has changed by the predetermined rate or more compared to the previous integrated information, setting the comparison-target pixel block size smaller by a predetermined rate than a previous block size and performing the state evaluating step, the state information integrating step and the integrated information determining step, and if the integrated information has changed less than the predetermined rate compared to the previous integrated information, determining the comparison-target pixel block size of that time point as a definitive comparison-target pixel block size; and
a step of setting the definitive comparison-target pixel block size as a parameter and performing a fluctuation correcting process.

7. The image processing apparatus of claim 4, wherein the parameter control unit sets a first and a second threshold value corresponding to the first and the second index, calculates a plurality of the sets from the first and the second image area provided at a plurality of positions in the image frames, and controls the sizes of the first and the second image area based on the number of sets in which the first index is equal to or higher than the first threshold value and the second index is lower than the second threshold value.

* * * * *